United States Patent [19]

House et al.

[11] Patent Number: 4,877,661
[45] Date of Patent: Oct. 31, 1989

[54] RAPIDLY RECOVERABLE PTFE AND PROCESS THEREFORE

[75] Inventors: Wayne D. House, Flagstaff; David J. Myers, Camp Verde, both of Ariz.

[73] Assignee: W. L. Gore & Associates, Inc., Newark, Del.

[21] Appl. No.: 110,145

[22] Filed: Oct. 19, 1987

[51] Int. Cl.$^4$ .......................... F16L 9/16; B32B 27/32; B29D 7/24

[52] U.S. Cl. ................................ 428/34.9; 264/288.8; 264/289.6; 264/DIG. 73; 428/398; 428/422; 428/910; 428/174; 428/364

[58] Field of Search ................. 428/36, 422, 398, 910, 428/34.9, 174, 364; 264/255.8, 289.6, DIG. 73

[56] References Cited

U.S. PATENT DOCUMENTS

| | | | |
|---|---|---|---|
| 3,086,242 | 4/1963 | Cook et al. | 264/DIG. 73 |
| 3,953,566 | 4/1976 | Gore | 428/422 |
| 3,962,153 | 6/1976 | Gore | 428/422 |
| 4,082,893 | 4/1978 | Okita | 428/422 |
| 4,187,780 | 2/1980 | Gore | 428/364 |
| 4,478,898 | 10/1984 | Kato | 428/422 |
| 4,550,447 | 11/1985 | Seiler et al. | 264/288.8 |
| 4,647,416 | 3/1987 | Seiler et al. | 264/241 |

FOREIGN PATENT DOCUMENTS

| | | |
|---|---|---|
| 0111339 | 6/1984 | European Pat. Off. . |
| 0051957 | 5/1987 | European Pat. Off. . |
| 1273717 | 5/1972 | United Kingdom . |
| 1357829 | 6/1974 | United Kingdom . |
| 1475316 | 6/1977 | United Kingdom . |
| 1505591 | 3/1978 | United Kingdom . |
| 2037294 | 7/1980 | United Kingdom . |
| 1577327 | 10/1980 | United Kingdom . |
| 2197870 | 6/1988 | United Kingdom . |

Primary Examiner—Ellis P. Robinson
Assistant Examiner—James J. Seidleck
Attorney, Agent, or Firm—Dena Meyer

[57] ABSTRACT

This invention relates to porous polytetrafluoroethylene (hereinafter PTFE) materials having the property of rapid recovery and a method for producing these materials. The microstructure of the porous PTFE material consists of nodes interconnected by fibrils, substantially all of the fibrils having a bent or wavy appearance. Artricles made from these materials are particularly suitable for use in the medical field, but are also useful in other areas such as filtration and fabric applications.

53 Claims, 3 Drawing Sheets

RAPIDLY RECOVERABLE PTFE AND PROCESS THEREFORE

BACKGROUND OF THE INVENTION

1. Field of the Invention

This invention relates to porous polytetrafluoroethylene (hereinafter PTFE) materials having the property of rapid recovery and a method for producing these materials. The microstructure of the porous PTFE material consists of nodes interconnected by fibrils, substantially all of the fibrils having a bent or wavy appearance. Articles made from these materials are particularly suitable for use in the medical field, but are also useful in other areas such as filtration and fabric applications.

2. Background of the Invention

Strong, porous PTFE products and their method of manufacture were first described in U.S. Pat. No. 3,953,566. Such products have found widespread acceptance in a myriad of fields. They are used in the medical field as replacement veins and arteries, as patch materials, as sutures and as ligaments. They have also found use in the fields of waterproof and breathable clothing, filtration, sealants and packings, and in threads and filaments for weaving and sewing. These products possess a microstructure of nodes interconnected by fibrils.

U.S. Pat. No. 3,962,153 discloses porous PTFE products with a very fine microstructure and very high strength as well as a process for making the same. U.S. Pat. No. 4,402,516 discloses porous PTFE products with a coarse microstructure but still maintaining the desired high strength. The products disclosed in these patents, like those disclosed in U.S. Pat. No. 3,953,566, have a microstructure of nodes interconnected by fibrils.

The products of the above mentioned patents are relatively inelastic. If they are stretched any appreciable amount they become deformed and will not regain their unstretched dimensions.

U.S. Pat. No. 4,443,511 discloses a method of making a laminated fabric composed partly of porous PTFE that has improved elastic properties. This patent, however, only discloses how to make a stretchable laminated article but does not teach how to provide porous PTFE with the property of rapid recoverability.

In the field of medical prostheses there have been a number of patents directed to tubular products that have elastic properties. U.S. Pat. No. 3,142,067 to Liebig describes a vascular prosthesis comprising a tubular fabric body made of Dacron in which crimps have been made throughout the length of the tube so that the final product demonstrates an elastic accordion-like behavior and is also said to possess flexibility and freedom from kinking under flexure and bending. U.S. Pat. No. 2,836,181 to Tapp similarly describes a nylon tube in which crimps have been made throughout the length of the tube so that it is resistant to kinking or collapsing.

SUMMARY OF THE INVENTION

This invention relates to shaped articles made from a material consisting essentially of PTFE. The shaped articles have a microstructure of nodes interconnected by fibrils substantially all of the fibrils having a bent or wavy appearance. The shaped articles have a rapid recovery of greater than about 5.5% and preferably greater than about 15%.

The products of this invention are preferably made by taking shaped articles of porous PTFE which have been expanded by stretching and have been heated above their crystalline melt point, compressing these articles in a direction parallel to but opposite to that in which they were expanded by stretching, restraining the articles and heating them at a temperature above their crystalline melt point for a period of time, allowing them to cool, removing the restraint and restretching them in the direction of original stretch to approximately their original length.

DETAILED DESCRIPTION OF THE INVENTION AND PREFERRED EMBODIMENTS WITH REFERENCE TO THE DRAWINGS

A method for producing porous PTFE products having a desirable rapid recovery property is provided. The porous products produced according to the invention are distinct from prior porous PTFE products in that they possess a rapid recovery property of greater than about 5.5%, i.e. they have a spring-like property. Furthermore, articles made by the present invention may undergo repeated applications of tensile loads and demonstrate approximately the same rapid recovery each successive load application and removal cycle.

Rapid recovery as herein defined is the difference between the extended length of the material and the recovered length with respect to the recovered length. The extended length is the length of material under tensile load and recovered length is the length of material measured 5 seconds after release of the tensile load.

An advantage possessed by rapid recoverable PTFE tubes made according to this invention is the improved bending characteristics demonstrated over the previous porous PTFE tubes. These tubes also show improved resistance to kinking, constriction or collapse under flexure.

The porous PTFE material that provides the precursor for this invention may be produced by the method described in U.S. Pat. No. 3,953,566, herein incorporated by reference. Using this method, a liquid lubricant is mixed with a commercially available powder of PTFE, and the mixture is extruded by a ram-type extruder or other type of extruder. The material is then expanded by rapid stretching either uniaxially, biaxially, or multiaxially after the liquid lubricant is removed from it.

The material after stretching is then heated while restrained to a temperature above its crystalline melt point of the polymer and held there for a period of time. The time and temperature will vary depending on the amount of material being heated. In general, the higher the temperature used, the shorter the time. A strong porous material is produced. This material having undergone uniaxial expansion has a microstructure of nodes interconnected by fibrils that are essentially parallel and straight.

While this invention can be used with products that have been biaxially or multi-axially stretched, the description that follows will describe a uniaxially stretched article.

Figure 1:
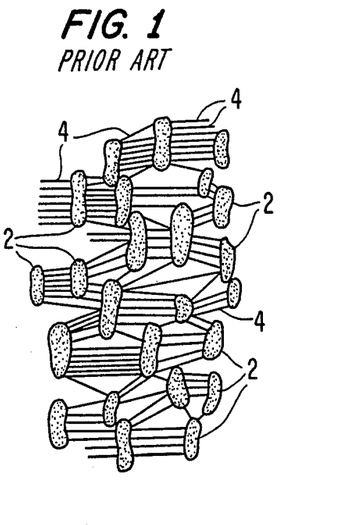
FIG. 1 is a schematic representation of the microstructure of porous PTFE known in the prior art.

FIG. 1 is a schematic plan view of a section of a uniaxially expanded PTFE material produced using the techniques disclosed in the U.S. Pat No. 3,953,566 patent. This section as seen under a microscope is depicted as possessing many nodes 2 interconnected by many fibrils 4. This shows the microstructure in which the longitudinal axes of the fibrils are all substantially parallel to the direction of expansion.

This precursor material is compressed in the direction parallel to but opposite to the direction in which it was originally expanded by stretching. The amount of compression depends on the nature of the shaped article and the desired product. In one embodiment the shaped article is compressed up to the point just prior to when it starts to become wrinkled or crimped. In this embodiment the shaped article is compressed to less than about one half of its original length and preferably to less than about one quarter of its original length. A second embodiment continues the compression such that wrinkles or crimps are intentionally created. In a third embodiment, the shaped article may be compressed to a lesser extent so that it is less than its original length but greater than half of its original length. In this third case the rapid recovery characteristic is greater than that of the precursor article, however, less than that for a more compressed article. The percent compression is calculated from the following equation:

$$C\% \frac{[l_o - l_c]}{[l_o]} \times 100\%$$

where $l_o$ is the original length of the precursor material and $l_c$ is the compressed length.

The material is then restrained in its compressed state and heated in an oven at an oven temperature in the range of about 100° to about 400° C. with the most preferred oven temperature being about 380° C. The heating may be done in a variety of types of ovens. The period of time during which the compressed article is heated may vary, but in any event, the lower the temperature, the longer time the article must be restrained. The time required for heating also may very depending on oven temperature, type of oven, and mass of the material.

While it is preferable to utilize a heating step, the material exhibits the rapid recovery characteristic if it is compressed and restrained at room temperatures, but it must be restrained for long periods of time, at least several days.

After the compressed material has been heated, it is cooled preferably to about 23° C. Cooling may occur through natural air currents, or by forced cooling. After cooling, the restraint is removed. Removal of the restraint prior to cooling of the compressed porous PTFE article may cause the article to lose some rapid recovery characteristics. The material is then restretched in the direction of original stretch to approximately its original length.

While the foregoing has described the starting material for this invention as porous PTFE materials which have been heated above their crystalline melt point, porous PTFE materials which have not been so heated may also be used. These materials, however, do not demonstrate the range of rapid recovery found in heat treated materials but they do demonstrate rapid recovery greater than that exhibited by precursor PTFE materials.

Figure 2:
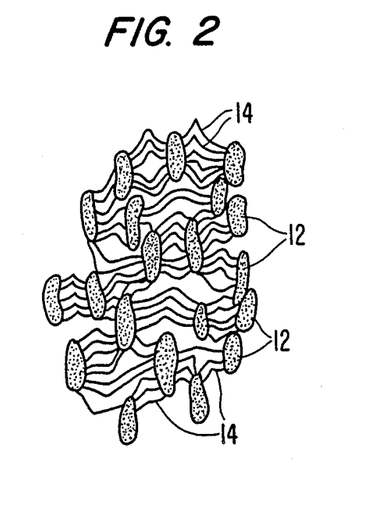
FIG. 2 is a schematic representation of the microstructure of the PTFE material of the present invention.
Figure 3:
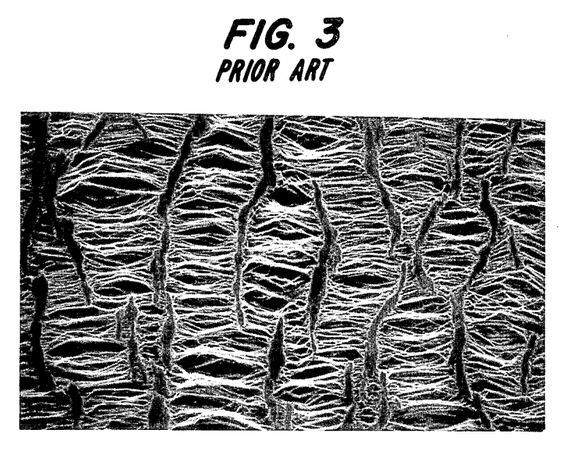
FIG. 3 is a photomicrograph (taken at 500x magnification) of the surface or prior art PTFE material made in accordance with U.S. Pat. No. 3,953,566 that was stretched in one direction.
Figure 4:
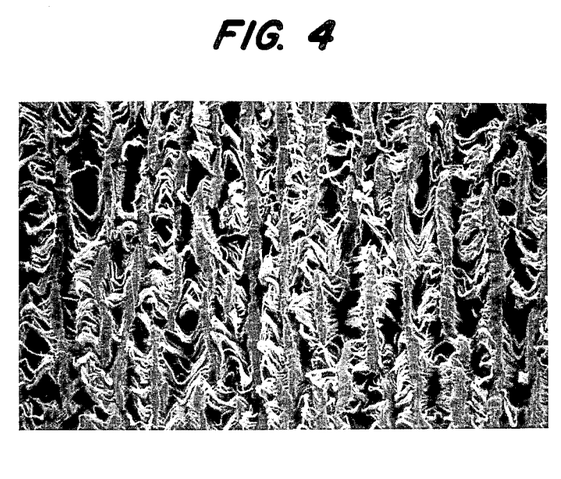
FIG. 4 is a photomicrograph (taken at 500x magnification) of the surface of PTFE material of the present invention.

The porous PTFE with rapid recovery is best understood by reference to the drawings provided. FIG. 2 is a schematic plan view of a section of expanded PTFE made according to this invention as seen under a microscope. Therein, nodes 12 are interconnected by fibrils 14. It is clearly seen that unlike the fibrils in FIG. 1, substantially all of the fibrils in FIG. 2 have a bent or wavy appearance. FIG. 3 and 4 are photomicrographs of PTFE materials made in accordance with the teachings of the prior art and that made in accordance with present invention respectively. FIG. 3 is a photomicrograph of the precursor tube that was subsequently compressed, restrained, heat treated and restretched in the direction of original stretch to approximately its original length, as shown in FIG. 4.

Figure 5:
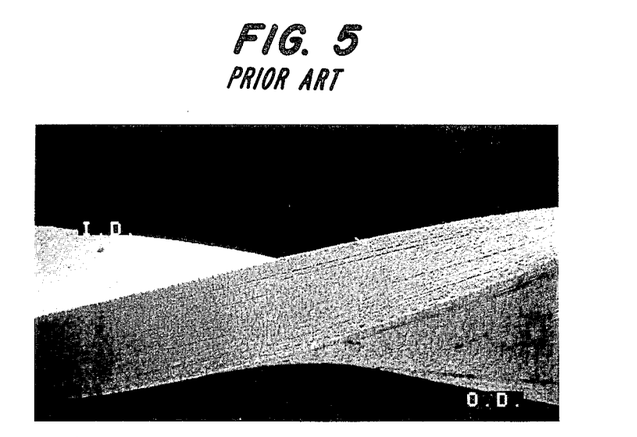
FIG. 5 is a photomicrograph (taken at 20x magnification) of the wall cross section of the PTFE material of the prior art.
Figure 6:
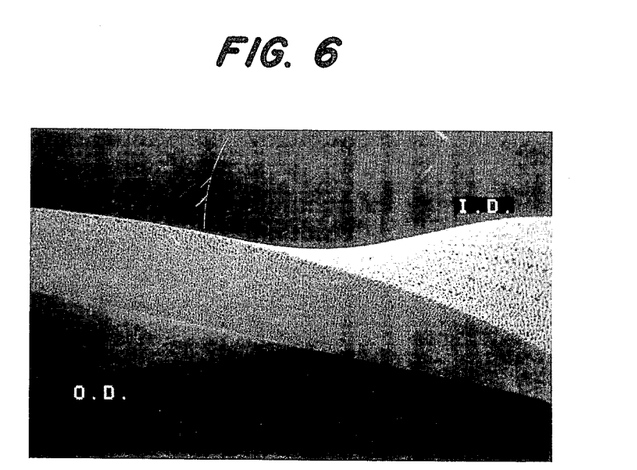
FIG. 6 is a photomicrograph (taken at 20x) of the wall cross section of the PTFE material made in accordance with the present invention.

Although the microstructure, specifically substantially all of the fibrils, undergoes a change in appearance, the overall appearance to the naked eye remains substantially unchanged. FIG. 5 is a photomicrograph of the wall cross section of the precursor PTFE tube material. FIG. 6 is a photomicrograph of the wall cross section of the PTFE tube material processed in accordance with the steps of this invention. That product shows smooth surfaces similar to those found in the precursor materials. One embodiment of the present invention is where the macrostructure (external surfaces and for a tube, external and internal surfaces) of the material does not demonstrate any apparent visible change in appearance. In an alternative embodiment the exterior surface and/or inferior surfaces of the PTFE material can be modified to produce a corrugated or rough surface.

Finished products made according to the method of this invention may include articles such as films, membranes, sheets, tubes, rods, and filaments. Sheets may also be made by slitting tubes longitudinally.

Porous rapid recoverable materials including tubes, films, membranes, or sheets maintain their hydrophobic nature and are also permeable to water vapor, causing them to be waterproof and breathable. They may be laminated, impregnated, and bonded to other materials and fabrics to provide composite structures having novel rapid recovery properties in addition to the known properties attributed to expanded PTFE. These rapid recoverable PTFE articles are useful in the medical field in applications such as vascular grafts, in fabric applications, as well as in filtration areas.

An Instron tensile tester was used for all testing. All tests were performed at a temperature of 23° C.±2° C. Each sample was cut in half transversely so that one part could be used to determine the maximum tensile force and the other to determine the rapid recovery. A crosshead speed of 500 mm/min and initial grip separation of 150 mm was used for all tests.

For samples that are too small to accommodate the 150 mm grip separation and allow enough material within the grips to prevent slippage of the sample within the grips, other combinations of crosshead speed and grip separation may be used provided the ratio of crosshead speed to initial grip separation is equal to 3.33 minutes$^{-1}$. By maintaining the ratio of crosshead speed to initial grip separation constant, all tensile tests are performed at a strain rate of 333%/minute.

First the maximum tensile force of one half of the sample material was determined. This was done on the Instron using standard pneumatically actuated cord grips. Sample breaks occurred away from the edge of the grips. The maximum tensile force was measured for tubes, rods and sheets per the examples. For the sheet example, the sheet was folded in half longitudinally and placed between the cord grips.

To apply 1% of the maximum tensile force, the cord grips were removed and replaced with pneumatically actuated flat rubber-faced grips. The other half of the sample (in either tube or rod form, or unfolded sheet, per the examples) was placed between these grips and a tensile load of 1% of the previously determined break force or maximum tensile force was applied using identical grip separation and strain rate as described above.

The length ($l_c$) of the sample while under the 1% of maximum tensile force was determined as the distance of the grip separation. Alternatively, length ($l_t$) may be measured from the Instron's chart recorder.

Immediately after reaching a tensile load equivalent to 1% of the maximum tensile force, the lower Instron grip was quickly released in order to allow the sample to recover. Five seconds after the release of tension, the actual length ($l_r$) of the sample that had been between the grips of the tester was measured.

The percent rapid recovery was then calculated from the following equation:

$$R.R \% \frac{[l_t - l_r]}{[l_r]} \times 100\%$$

where $l_t$ was the test sample length under tensile load and $l_r$ was the test sample length measured 5 seconds after release of tensile load.

Wall thickness measurements of the precursor tubes were taken by cutting a 2.5 cm long sample from the end of the tube sample with a razor blade. This sample was then smoothly fitted over a stainless steel mandrel of outside diameter corresponding to inside diameter of the tube. The thickness measurement was made using a profile projector to measure the distance from the outer surface of the mandrel to the outer surface of the cut end of the tube sample. Measurements were made at three places spaced approximately 120° apart around the circumference of the tube. The wall thickness of the sample was taken as the mean of these three measurements.

The fibril length of the test samples in the examples following was determined by photographing the surface of the sample under 200x magnification. Two parallel lines were drawn 12mm above and below the longitudinal centerline of the photographs, parallel to the direction of the fibrils. Following the top edge of the upper line and starting from the left margin of the photograph, the distance from the right edge of the first distinct node to the left edge of the second distinct node was measured as the first fibril length. Measurements were made using dividers referenced to a scale that accounted for the magnification factor.

Five consecutive fibril length measurements were made in this manner along the drawn line. The photograph was rotated 180° and five consecutive fibril length measurements were taken from the left margin of the photograph along the top edge of the second drawn line. The mean fibril length of the sample was taken to be the mean of the ten photograph measurements.

Both wall thickness and fibril length measurements were made on the precursor tubes prior to the inventive steps being applied.

The following examples which disclose processes and products according to the present invention are illustrative only and not intended to limit the scope of the present invention in any way.

EXAMPLE 1

Rapid Recoverable Expanded PTFE Tubes

CD123 fine powder PTFE resin (obtained from ICI Americas) was blended with 150 cm$^3$ of ISOPAR M, odorless solvent (obtained from the Exxon Corporation), per pound of PTFE resin. The mixture was compressed into a tubular billet, heated to about 60° C. and extruded into tubes in a ram extruder having a reduction ratio of about 240:1. Lubricant was removed from the extrudate by drying in a forced convection air oven at 250° C. for thirty minutes. The tubes were then expanded by stretching utilizing the stretching technology taught in U.S. Pat. No. 3,953,566. Sample tubes 1, 2, 3, and 5 in Table 1 were expanded 8.4:1, at a rate of about 50% per second in a forced convection air oven at a temperature of 290° C. These tubes had fibril lengths of about 35 microns. Sample tubes 4 were expanded 2.3:1, at a rate of about 160%/second in a forced convection air oven at a temperature of 290° C. These tubes had a fibril lengths of about 10 microns. All tubes, except sample 5, were subsequently heat treated in a gravity convection air oven for 90 seconds at 393° C. All tubes had a 10 mm inside diameter.

One tube of each type was retained as a control sample. Percent rapid recovery measurements for the control or precursor tube are shown in comparison to tubes processed with the method of this invention in Table 1.

In accordance with the invention, tubes were fitted over stainless steel mandrels of 10 mm outside diameter. One end of each tube was secured to its mandrel with a restraining wire. The free end of each tube sample was pushed by hand longitudinally toward the restrained end of the tube, thus compressing the tube sample longitudinally. The percentages of compression for each sample were calculated with the formula described above and are presented in Table 1. Each tube sample was compressed uniformly without wrinkling or otherwise distorting the exterior surface. The free end of each tube was secured to the mandrel with a second restraining wire. Each tube and mandrel assembly was placed in a gravity convection air oven for a predetermined time and oven temperature, both parameters of which are presented in Table 1. Each tube and mandrel assembly was removed from the oven and allowed to cool to about 23° C. The restraining wires for each assembly were removed and the tubes were removed from their mandrels. Each sample was restretched in the direction of original stretch to approximately its original length and allowed to recover for at least one hour. Percent rapid recovery was calculated for each tube using the equation previously described. Results of the percent rapid recovery are summarized in Table 1.

tween the grips of the Instron tensile tester with a grip separation of 150 mm. Crosshead speed was set at 500 mm/min to provide a strain rate of 333%/minute. The Instron machine was programmed to stop its crosshead

TABLE 1

RAPID RECOVERY TUBES

| Sample | Precursor Tube Characteristics (Control) | | | | | Inventive Process Parameters | | | Inventive Tube Rapid Recovery Characteristics | |
|---|---|---|---|---|---|---|---|---|---|---|
| | Wall Thickness (mm) | Mean Fibril Length (Micron) | Prior Heat Treatment to above crys. melt point | 1% of Max. Tensile Force (kg) | % Rapid Recovery | % Compression | Oven Temp. °C. | Time Heated (min) | 1% of Max. Tensile Force (kg) | % Rapid Recovery |
| 1 | .9 | 29 | Yes | .66 | 3.8 | 84 | 380 | 3 | .53 | 22.3 |
| 2 | 1.0 | 32 | Yes | .63 | 3.7 | 50 | 380 | 3 | .57 | 5.7 |
| 3 | 1.2 | 39 | Yes | .69 | 1.2 | 85 | 100 | 3000 | .63 | 16.9 |
| 4 | 1.1 | 10 | Yes | .88 | 3.3 | 66 | 380 | 3 | .68 | 19.5 |
| 5 | .7 | 31 | No | .38 | 3.2 | 72 | 300 | 10 | .28 | 5.8 |

EXAMPLE 2

Rods

A rod of one quarter-inch nominal diameter GORE-TEX Joint Sealant, available commercially from W. L. Gore and Associates, Inc., Elkton, MD, was used as the precursor porous PTFE material to be processed by the method of this invention. This material had not been heated above its crystalline melt point.

A portion of the test sample was cut off and retained as a control for determination of the percent rapid recovery of the precursor material. A second sample of 300 mm length was placed into a thinwall stainless steel tube of 0.21″ inside diameter and compressed manually achieving a 67% compression. This compression was maintained by use of a plug restraint. The assembly was heated in a gravity-convection air oven to an oven temperature of about 300° C. for 15 minutes while the sample was restrained in its compressed state. The assembly was removed from the oven and allowed to cool to approximately 23° C. The restraint was removed and the sample was removed from the stainless steel tube. The sample was restretched in the direction of original stretch to approximately its original length by hand and allowed to recover for more than one hour. Percent rapid recovery measurements were made both of control samples and samples processed according to the inventive steps described above. Measurements and calculations were made utilizing the percent rapid recovery as defined in the specification. Results are shown in Table 2.

travel upon achieving 0.53 kg tensile load similar to that of Example 1, sample 1. The length ($l_t$) of the sample while under the 1% of maximum tensile force was determined by measuring the distance between the grips. Alternatively, length ($l_t$) may be measured from the Instron's chart recorder. When the crosshead stopped, the lower grip of the Instron was released, freeing the sample and allowing it to recover in length. Five seconds after the sample was freed from the lower Instron grip, the actual length $l_r$ of the sample that had been between the grips of the Instron was measured and recorded. The crosshead was returned to its starting position to again provide a grip separation of 150 mm. The sample was again clamped between the lower grips of the Instron at the same point on the sample. Sixty seconds after the first application of tension, 0.53 kg tension was again applied and the entire test was repeated. This was done a total of ten times, with $l_t$ and $l_r$ being measured and recorded each time. Percent rapid recovery was calculated as previously defined for each tension application. The results are presented in Table 3.

TABLE 3

| Test Run | % Rapid Recovery |
|---|---|
| 1 | 21.8 |
| 2 | 22.2 |
| 3 | 20.4 |
| 4 | 20.4 |
| 5 | 20.3 |
| 6 | 20.3 |
| 7 | 20.9 |
| 8 | 20.3 |
| 9 | 19.7 |
| 10 | 19.1 |

TABLE 2

| Sample | Mean Fibril Length (Micron) | 1% of Max. Tensile Force (kg) | % Rapid Recovery | Inventive Process Parameters | | | 1% of Max. Tensile Force (kg) | Inventive Rod % Rapid Recovery |
|---|---|---|---|---|---|---|---|---|
| | | | | % Compression | Oven Temp. °C. | Time Heated (min) | | |
| Control Rod | 41 | .29 | 2.0 | — | — | — | — | — |
| Inventive | — | — | — | 67 | 300 | 15 | .24 | 6.7 |

EXAMPLE 3

Repeatability

A rapidly recoverable tube (sample 1) from Example 1 was stretched 10 times in order to determine the range of % rapid recovery for a sample that had been exposed to repeated elongations. The sample was placed be-

EXAMPLE 4

Flat Sheet

Figure 7:
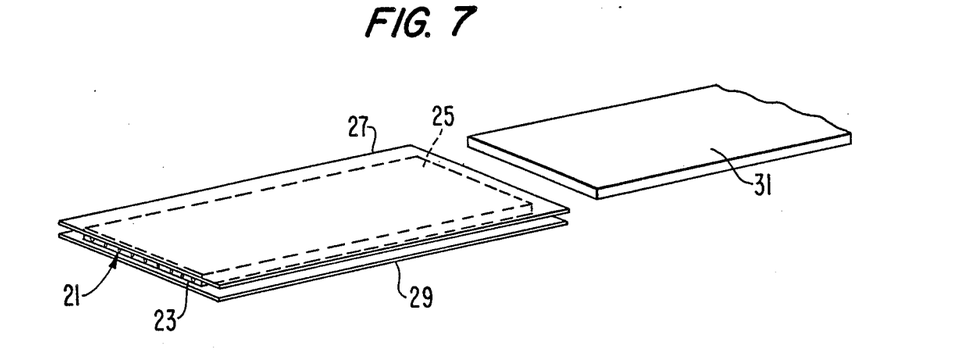
FIG. 7 is a schematic diagram of a compression procedure for Example 4.

Flat rectangular sheets of expanded PTFE were obtained by longitudinally slitting a 10 mm inside diameter tube made in the same manner as the precursor tube of Example 1, Sample 1. One of these sheets was retained as control sample for determination of its percent rapid recovery. Referring to FIG. 7, a second sample sheet 21 was clamped between two thin stainless steel plates 27 and 29 separated to about 0.9 mm from each other. One end edge 23 of the sample sheet 21 was restrained from moving. The opposite end edge 25 was moved toward the restrained end edge with the use of a stainless steel plate 31 thus compressing the sheet of material in the direction of the fibrils, i.e. in the direction parallel to but opposite to the direction it had been stretched. The material was compressed 83%. The compressed sample was restrained and the assembly was heated in a gravity convection air oven at a temperature of about 380° C. for about 5 minutes. After removal from the oven, the assembly was allowed to cool to about 23° C. and the sheet sample was removed from between the plates. The sample was restretched in the direction of original stretch to approximately its original length and allowed to recover for more than one hour. The percent rapid recovery was measured and calculated using the formula previously described. Results for both inventive and control samples are shown in Table 4.

It is to be understood that the above description, drawings and examples are illustrative of this invention and not in limitation thereof. As will be evident to those skilled in the art, various modifications can be made in light of the foregoing disclosure and discussion without departure from the spirit or scope of the disclosure or from the scope of the claims.

TABLE 4

| Sample | Thickness (mm) | Mean Fibril Length (Micron) | 1% of Max. Tensile Force (kg) | % Rapid Recovery | Inventive Process Parameters | | | 1% of Max. Tensile Force (kg) | Inventive Sheet % Rapid Recovery |
|---|---|---|---|---|---|---|---|---|---|
| | | | | | % Compression | Oven Temp. C.° | Time Heated (min) | | |
| Control | 1.0 | 44 | .63 | 2.0 | — | — | — | — | — |
| Inventive | — | — | — | — | 83 | 380 | 5 | .48 | 16.4 |

We claim:

1. A porous shaped article consisting essentially of PTFE, said article having a microstructure of nodes interconnected by fibrils, said article at ambient temperature capable of being stretched and then rapidly recovering more than about 6% of its stretched length.

2. The article of claim 1 in which said article at ambient temperature is capable of being stretched and then rapidly recovering more than about 8%.

3. The article of claim 1 in which said article at ambient temperature is capable of being stretched and then rapidly recovering more than about 10%.

4. The article of claim 1 in which said article at ambient temperature is capable of being stretched and then rapidly recovering more than about 15%.

5. The article of claim 1 in which said article at ambient temperature is capable of being stretched and then rapidly recovering more than about 20%.

6. The article of claim 1 in which said article at ambient temperature is capable of being stretched and then rapidly recovering more than about 22%.

7. The article of claim 1 in which said article at ambient temperature is capable of being stretched and then rapidly recovering more than about 25%.

8. The article of claim 1 in which said article at ambient temperature is capable of being stretched and then rapidly recovering more than about 30%.

9. The article of claim 1 in which said article at ambient temperature is capable of being stretched and then rapidly recovering more than about 50%.

10. A porous article consisting essentially of PTFE, said article having a microstructure of nodes interconnected by fibrils, substantially all of said fibrils having a bent appearance, said article at ambient temperature is capable of being stretched and then rapidly recovering more than 5.5% of its stretched length.

11. The article of claim 10 in which said article at ambient temperature is capable of being stretched and then rapidly recovering more than 6% of its stretched length.

12. The article of claim 10 in which said article at ambient temperature is capable of being stretched and then rapidly recovering more than 8% of its stretched length.

13. The article of claim 10 in which said article at ambient temperature is capable of being stretched and then rapidly recovering more than 10% of its stretched length.

14. The article of claim 10 in which said article at ambient temperature is capable of being stretched and then rapidly recovering more than 15% of its stretched length.

15. The article of claim 10 in which said article at ambient temperature is capable of being stretched and then rapidly recovering more than 20% of its stretched length.

16. The article of claim 10 in which said article at ambient temperature is capable of being stretched and then rapidly recovering more than 22% of its stretched length.

17. The article of claim 10 in which said article at ambient temperature is capable of being stretched and then rapidly recovering more than 25% of its stretched length.

18. The article of claim 10 in which said article at ambient temperature is capable of being stretched and then rapidly recovering more than 30% of its stretched length.

19. The article of claim 10 in which said article at ambient temperature is capable of being stretched and then rapidly recovering more than 50% of its stretched length.

20. An article according to any of the above claims in the shape of a tube having smooth inside and outside surfaces.

21. An article according to claim 20 in which the inside surface and the outside surface differ.

22. An article according to claim 1 which has been formed as a tube and subsequently slit longitudinally and opened to form a sheet.

23. An article according to claim 1 in the form of a sheet.

24. An article according to claim 1 in the form of a rod.

25. An article according to claim 1 in the form of a film.

26. An article according to claim 1 in the form of a filament.

27. An article claimed in claim 1 that has corrugated surfaces.

28. An extruded, expanded article heat treated above its crystalline melt point, made of a material consisting essentially of porous polytetrafluoroethylene (PTFE) having been subsequently compressed at least 50% in the direction in which rapid recoverable characteristics are desired, restrained and heated.

29. An extruded, expanded and heat treated above its crystalline melt point article as claimed in claim 28 wherein the material was subsequently compressed at least 60% in the direction of desired rapid recoverable characteristics.

30. An extruded, expanded and heat treated above its crystalline melt point article as claimed in claim 28 wherein the material was compressed at least 75% in the direction of desired rapid recoverable characteristics.

31. An extruded, expanded and heat treated above its crystalline melt point article as claimed in claim 28 wherein the material was compressed at least 90% in the direction of desired rapid recoverable characteristics.

32. An article as claimed in claim 28 having a rapid recovery greater than about 5.5%.

33. An article as claimed in claim 28 having a rapid recovery greater than about 10%.

34. An article as claimed in claim 28 having a rapid recovery greater than about 20%.

35. An article as claimed in claim 28 having a rapid recovery greater than about 25%.

36. An article as claimed in claim 28 having a rapid recovery greater than about 30%.

37. An article as claimed in claim 28 having a rapid recovery greater than about 50%.

38. An article as claimed in claim 28 having a rapid recovery greater than about 75%.

39. An article as claimed in claim 28 that is in the shape of a tube having smooth inside and outside surfaces.

40. An article as claimed in claim 28 that is in the shape of a tube in which the inside surface and the outside surface differ.

41. An article as claimed in claim 28 which has been formed as a tube and subsequently slit longitudinally and opened to form a sheet.

42. An article as claimed in claim 28 that is in the shape of a sheet made other than by slitting tubes.

43. An article claimed in claim 28 that is in the shape of a rod.

44. An article claimed in claim 28 that is in the shape of a film.

45. A porous shaped article consisting essentially of PTFE, said article having a microstructure of nodes and fibrils made by the following steps comprising:
  (a) compressing said article to less than 50% of its original length and restraining it;
  (b) heating said article at an elevated temperature for a period of time;
  (c) cooling said article; and
  (d) stretching said article to approximately its original length.

46. A porous PTFE article of claim 45 in which said article at ambient temperature has a rapid recovery greater than about 6%.

47. A porous PTFE article of claim 45 in which said article at ambient temperature has a rapid recovery greater than about 8%.

48. A porous PTFE article of claim 45 in which said article at ambient temperature has a rapid recovery greater than about 10%.

49. A porous PTFE article of claim 45 in which said article at ambient temperature has a rapid recovery greater than about 15%.

50. A porous PTFE article of claim 45 in which said article at ambient temperature has a rapid recovery greater than about 20%.

51. A porous PTFE article of claim 45 in which said article at ambient temperature has a rapid recovery greater than about 22%.

52. A porous PTFE article of claim 45 in which said article at ambient temperature has a rapid recovery greater than about 25%.

53. A porous PTFE article of claim 45 in which said article at ambient temperature has a rapid recovery greater than about 30%.

* * * * *

UNITED STATES PATENT AND TRADEMARK OFFICE
CERTIFICATE OF CORRECTION

PATENT NO. : 4,877,661

DATED : Oct. 31, 1989

INVENTOR(S) : Wayne D. House and David J. Myers

It is certified that error appears in the above-identified patent and that said Letters Patent is hereby corrected as shown below:

Column 3, line 44, the equation:

$$C \% \frac{[l_o - l_c]}{[l_o]} \times 100\%$$

should read:

$$C \% = \frac{[l_o - l_c]}{[l_o]} \times 100\%$$

Column 5, line 41, the equation:

$$R.R \% \frac{[l_t - l_r]}{[l_r]} \times 100\%$$

should read:

$$R.R \% = \frac{[l_t - l_r]}{[l_r]} \times 100\%$$

Signed and Sealed this

Fifth Day of February, 1991

*Attest:*

HARRY F. MANBECK, JR.

*Attesting Officer*     *Commissioner of Patents and Trademarks*